United States Patent
Zhang et al.

(10) Patent No.: US 9,160,808 B2
(45) Date of Patent: Oct. 13, 2015

(54) TRANSMITTING PRODUCT INFORMATION

(75) Inventors: Xu Zhang, Hangzhou (CN); Louhua Zhu, Hangzhou (CN); Haijie Gu, Hangzhou (CN); Duoquan Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 1 day.

(21) Appl. No.: 13/393,310

(22) PCT Filed: Nov. 10, 2011

(86) PCT No.: PCT/US2011/060266
§ 371 (c)(1),
(2), (4) Date: Feb. 29, 2012

(87) PCT Pub. No.: WO2012/067949
PCT Pub. Date: May 24, 2012

(65) Prior Publication Data
US 2013/0227054 A1 Aug. 29, 2013

(30) Foreign Application Priority Data
Nov. 17, 2010 (CN) .......................... 2010 1 0547218

(51) Int. Cl.
G06F 15/16 (2006.01)
H04L 29/08 (2006.01)
G06Q 30/06 (2012.01)

(52) U.S. Cl.
CPC .............. *H04L 67/32* (2013.01); *G06Q 30/06* (2013.01)

(58) Field of Classification Search
CPC .......... G06Q 30/0282; G06Q 30/0255; G06Q 30/0631; G06F 17/3053; H04N 21/44222; H04N 21/4668; H04N 21/6582
USPC ................ 709/217; 707/748; 705/347, 14.52, 705/14.53, 26.1, 26.7, 14.49
See application file for complete search history.

(56) References Cited

U.S. PATENT DOCUMENTS 6,615,208 B1 9/2003 Behrens et al.
6,687,696 B2 2/2004 Hofmann et al.
(Continued)

FOREIGN PATENT DOCUMENTS

CN 101727644 6/2010
JP 2010061513 3/2010

OTHER PUBLICATIONS

PCT Search Report and Written Opinion mailed Feb. 21, 2012 for PCT application No. PCT/US11/60266, 7 pages.
(Continued)

*Primary Examiner* — Brian J Gillis
*Assistant Examiner* — Shean Tokuta
(74) *Attorney, Agent, or Firm* — Van Pelt, Yi & James LLP

(57) ABSTRACT

The present disclosure provides a method and device for transmitting recommended product information. In one embodiment, a system retrieves product evaluation records given by one or more users. Each of the product evaluation records includes an identification of the user (user ID), an identification of the product (product ID), and evaluation information. The system uses the user ID and the product ID as a primary key, and then, based on intervals of the primary key, divides the product evaluation records into several subsets of records, and assigns these subsets of records into multiple calculation nodes. The system retrieves such SVD calculation results of the multiple subsets of records from the multiple calculation nodes. The recommended product information is sent to a client terminal based on the SVD calculation results. The present disclosure implements the distribution processing of SVD calculation, reduces the calculation complexity, and saves the calculation time.

19 Claims, 5 Drawing Sheets

(56) References Cited

U.S. PATENT DOCUMENTS

| | | |
|---|---|---|
| 7,475,027 B2 | 1/2009 | Brand |
| 7,962,461 B2 * | 6/2011 | Ruhl et al. .................... 707/706 |
| 8,019,707 B2 | 9/2011 | Shani et al. |
| 8,037,080 B2 | 10/2011 | Koren |
| 2002/0062241 A1 * | 5/2002 | Rubio et al. .................... 705/10 |
| 2002/0147622 A1 * | 10/2002 | Drolet et al. ..................... 705/7 |
| 2002/0178163 A1 | 11/2002 | Mayer |
| 2004/0158497 A1 * | 8/2004 | Brand .............................. 705/26 |
| 2005/0165782 A1 | 7/2005 | Yamamoto |
| 2006/0093222 A1 * | 5/2006 | Saffer et al. ................... 382/224 |
| 2006/0129446 A1 * | 6/2006 | Ruhl et al. ...................... 705/10 |
| 2006/0242192 A1 | 10/2006 | Musgrove et al. |
| 2007/0150428 A1 * | 6/2007 | Webb ............................... 706/46 |
| 2008/0104111 A1 | 5/2008 | Slaney et al. |
| 2009/0024621 A1 * | 1/2009 | Burgess et al. .................. 707/6 |
| 2009/0089265 A1 | 4/2009 | Saito et al. |
| 2009/0195796 A1 | 8/2009 | Monga et al. |
| 2009/0216821 A1 | 8/2009 | Nakamura et al. |
| 2009/0216996 A1 * | 8/2009 | Goodman et al. .............. 712/28 |
| 2009/0299996 A1 | 12/2009 | Yu et al. |
| 2010/0030764 A1 * | 2/2010 | Koren .............................. 707/5 |
| 2010/0050211 A1 * | 2/2010 | Seldin et al. .................... 725/46 |
| 2010/0262556 A1 | 10/2010 | Shaya et al. |
| 2010/0268661 A1 * | 10/2010 | Levy et al. ..................... 705/347 |
| 2010/0312724 A1 * | 12/2010 | Pinckney et al. ............... 706/11 |
| 2010/0325028 A1 * | 12/2010 | Tanaka et al. .................. 705/37 |
| 2011/0061076 A1 * | 3/2011 | Ali et al. ......................... 725/46 |
| 2011/0064221 A1 * | 3/2011 | McSherry et al. ............ 380/252 |
| 2011/0112981 A1 | 5/2011 | Park et al. |
| 2011/0153663 A1 * | 6/2011 | Koren et al. .................. 707/776 |
| 2011/0184806 A1 * | 7/2011 | Chen et al. ................. 705/14.52 |
| 2011/0230229 A1 * | 9/2011 | Das et al. .................... 455/550.1 |
| 2012/0030159 A1 * | 2/2012 | Pilaszy et al. ................... 706/46 |
| 2012/0030163 A1 * | 2/2012 | Zhong et al. .................... 706/52 |

OTHER PUBLICATIONS

Yanagihara et al. "A Proposal for Applying Dimension Reduction in Cross-Media Recommendation" FIT2007 The 6th Information Science and Technology Forum Collection of Papers in General Lecture. The 2nd Separate Volume Database Natural Language, Sound, Music, Artificial Intelligence, Game Biomimetrics. Information Processing Society of Japan, Aug. 22, 2007, pp. 83-86.

* cited by examiner

TRANSMITTING PRODUCT INFORMATION

CROSS REFERENCE TO RELATED PATENT APPLICATIONS

This application is a national stage application of an international patent application PCT/US11/60266, filed Nov. 10, 2011, which claims foreign priority to Chinese Patent Application No. 201010547218.0 filed on Nov. 17, 2010, entitled "METHOD AND DEVICE FOR TRANSMITTING PRODUCT INFORMATION," which applications are hereby incorporated by reference in their entirety.

TECHNICAL FIELD

The present disclosure relates to a field of communication technology and, more specifically, to a method and a device for transmitting product information.

BACKGROUND

As the internet becomes more popular and widespread, and internet systems provide more and more options for users, the contents of websites become more complicated. Take the e-commerce website as an example, users often get lost in the variety of product information provided by the e-commerce website, and have a hard time finding the product that they need. In order to solve this problem, internet systems often, based on the user's product evaluation information, perform a recommendation algorithm to determine the products that the user would need, and then send such product information to the user. This would help the user find the product in need, and complete the purchase process.

Among the recommendation algorithms used in the internet, the singular value decomposition (SVD) is a relatively accurate algorithm, which breaks down and analyzes the main variables using a matrix to obtain dimension reduction and find latent variables. Specifically, the order m×n real matrix A may be decomposed into m-order orthogonal matrix U, n-order orthogonal matrix V, and the product of diagonal matrix S. Through the SVD algorithm, user preference information and evaluated product information may be derived from the user's product evaluation information. The product may be recommended to the user based on the user preference information and the evaluated product information.

When the current internet systems use the SVD algorithm to recommend products to users, however, they are unable to distribute the user information, product information and the user's product evaluation information to multiple calculation nodes to perform calculation. Instead, they can only perform calculation on a single calculation node. This leads to problems such as the large volume of data to be processed, the complicated calculation process, and the long consumption time. In addition, using one calculation node has a limited expansion capability. As the user information and product information increase, this processing model cannot satisfy the performance requirements.

SUMMARY

The present disclosure provides a method and a device for transmitting recommended product information to a client terminal.

In one example, the present disclosure provides a method for transmitting product information. A system retrieves product evaluation records given by one or more users. Each of the product evaluation records includes an identification of the user (user ID), an identification of the product (product ID), and evaluation information.

The system uses the user ID and the product ID as a primary key, and then, based on intervals of the primary key, divides the product evaluation records into several subsets of records, and assigns these subsets of records into multiple calculation nodes. All the evaluation information in the evaluation records that are related to the same user ID or the same product ID are classified into one subset of records.

The multiple calculation nodes obtain SVD calculation results based on the assigned subsets of records. The system retrieves such SVD calculation results. The recommended product information is sent to the client terminal based on the SVD calculation results.

In another example, the present disclosure provides a device for transmitting product information. The device includes a retrieval module, an assignment module, and a transmission module.

The retrieval module retrieves the product evaluation records from one or more users. The product evaluation records include the user ID, the product ID, and evaluation information.

The assignment module uses the user ID and the product ID as a primary key, and then, based on the primary key range, divides the product evaluation records into several subsets of records, and assigns these subsets of records into multiple calculation nodes. All the evaluation information in the evaluation records that are related to the same user ID or the same product ID are classified into one subset of records.

The transmission module retrieves the SVD calculation result obtained by the multiple calculation nodes based on the assigned subsets of records, and sends the recommended product information to the client terminal based on the SVD calculation result.

The example embodiment of the present disclosure includes at least the following advantages. The product evaluation records are divided by using the user ID and product ID as the primary key. The divided subsets of records are assigned into multiple calculation nodes and evaluation information in the evaluation records that are related to the same user ID or the same product ID are classified into one subset of records. This achieves the purpose to logically and simply assign evaluation records to multiple calculation nodes. Further, as the product evaluation records are assigned to the multiple calculation nodes for parallel calculation, and the recommended product information is sent to the client terminal based on the SVD calculation result, such techniques reduce the data volume and calculation complexity handled by the multiple calculation nodes. Using the user ID and product ID as the primary key in assigning the product evaluation records also ensures the completeness of the data processed by the calculation nodes, thereby increasing the accuracy of the calculation. It is to be appreciated that not all embodiments of the present disclosure need to simultaneously achieve all the advantages.

BRIEF DESCRIPTION OF THE DRAWINGS

To better illustrate embodiments of the present disclosure or techniques of the current technologies, the following is a brief introduction of FIGs to be used in descriptions of the embodiments. It is apparent that the following FIGs only relate to some embodiments of the present disclosure. A person of ordinary skill in the art can obtain other embodiments according to the FIGs in the present disclosure without creative efforts.

DETAILED DESCRIPTION

In one embodiment, a system retrieves product evaluation records from one or more users. Each of the product evaluation records includes an identification of the user (user ID), an identification of the product (product ID), and evaluation information.

The system uses the user ID and the product ID as a primary key, and then, based on the primary key range, divides the product evaluation records into several subsets of records, and assigns these subsets of records into multiple calculation nodes. All the evaluation information in the evaluation records that are related to the same user ID or the same product ID are classified into one subset of records. The multiple calculation nodes are computing devices with certain computing functionalities. Examples of the calculation nodes may include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The multiple calculation nodes obtain the SVD calculation results based on the assigned subsets of records. The system retrieves such SVD calculation results. The recommended product information is sent to the client terminal based on the SVD calculation results.

The present disclosure, by reference to the figures, describes the techniques as below. The example embodiment described here is a portion of the embodiments of the present disclosure instead of all of the embodiments. Based on the disclosed example embodiments, all other embodiments developed by a person of ordinary skill in the art without contributing creative efforts are under the protection of the present disclosure.

Figure 1:
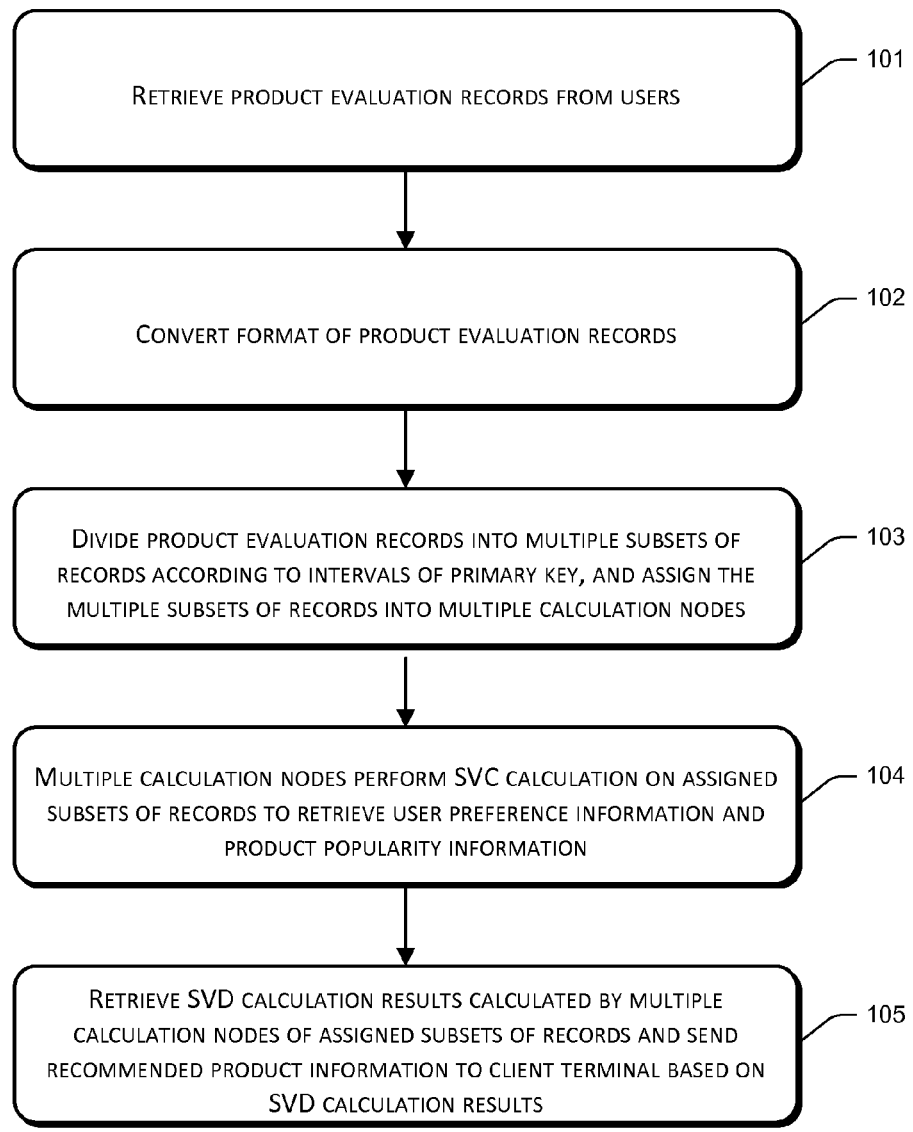
FIG. 1 illustrates a flow diagram of an example method for transmitting product information.

FIG. 1 illustrates a flow diagram of an example method for transmitting product information.

At 101, the product evaluation records are retrieved from one or more users.

After the user purchases products from the e-commerce website, the e-commerce website usually provides a chance for the user to evaluate the purchased products or the buying process, and these evaluations are stored in the e-commerce website in the form of evaluation records. The evaluation records can be stored in the database in the form of text. Each of the evaluation records may include the user ID, the product ID and evaluation information. The evaluation information can be the user's rating of the product, or a preference of the user relative to the product.

For example, the evaluation information can be any number from 1 to 5. 1 means that the user is strongly dissatisfied with the product, 2 means that the user is dissatisfied with the product, 3 means that the user finds the product acceptable, 4 means that user is satisfied with the product, and 5 means that the user is very satisfied with the product. If the user does not evaluate the product, a value of 0 may be set in the corresponding evaluation information of the evaluation record, as shown in Table 1.

TABLE 1

| Evaluation Record Entries | | |
|---|---|---|
| | User 1 | User 2 |
| Product 1 | 3 | 1 |
| Product 2 | 2 | 0 |
| Product 3 | 4 | 5 |

The above evaluation records may also be represented by a matrix. The elements in the matrix are the evaluation information, in which the row number corresponds to either the user ID or the product ID, and the column number correspond to either the user ID or the product ID. For example, the evaluation records in table 1 can be represented by a matrix as follows:

$$\begin{bmatrix} 3 & 1 \\ 2 & 0 \\ 4 & 5 \end{bmatrix}$$

In the above matrix, the row number corresponds to the product ID, while the column number corresponds to the user ID.

At 102, the product evaluation records are subject to format conversion.

For example, the order of the corresponding evaluation information of each user ID and/or product ID in the product evaluation records may be adjusted. In addition, the evaluation information corresponding to one or more user IDs and/or product IDs may be deleted. Such deleted evaluation information may be those of users whose number of evaluated products fall below a lowest predefined threshold, such as the users who have evaluated only one product. Such deleted evaluation information may also be those of users whose number of evaluated products are more than a highest predefined threshold. There is a possibility that such evaluation information is generated by malicious software at the internet. Deleting such evaluation information helps to remove noise influence in the product evaluation records.

When the product evaluation records are represented using a matrix, the above-mentioned format conversion process may be as follows. First, column exchange and row exchange are performed on the matrix. Some columns and rows are deleted. The matrix is then converted to several non-intersecting sub-matrices. As the number of users and products rapidly increase, and the number of products evaluated by the users is limited, many products may not have evaluation records. Therefore, the evaluation records' corresponding matrix is a sparse matrix, where the non-zero elements occupy a small percentage of the total number of elements. Based on the above process, the non-zero elements in the sparse matrix can be collected into multiple non-intersecting sub-matrices. For example, the product evaluation records can be represented by the Sparse Matrix 1 below:

$$\begin{bmatrix} 1 & 0 & 0 & 0 & 0 & 0 & 0 & 0 & 0 & 0 \\ 0 & 0 & 0 & 0 & 0 & 4 & 2 & 3 & 0 & 0 \\ 0 & 0 & 0 & 0 & 0 & 0 & 0 & 0 & 0 & 3 \\ 0 & 0 & 0 & 0 & 0 & 1 & 1 & 4 & 0 & 0 \\ 0 & 0 & 0 & 3 & 0 & 3 & 5 & 4 & 0 & 0 \\ 0 & 0 & 0 & 0 & 0 & 0 & 0 & 0 & 2 & 0 \\ 0 & 3 & 5 & 1 & 0 & 2 & 0 & 0 & 0 & 0 \\ 0 & 2 & 3 & 2 & 0 & 0 & 0 & 0 & 0 & 0 \\ 0 & 2 & 5 & 4 & 0 & 0 & 0 & 0 & 0 & 0 \\ 0 & 1 & 0 & 0 & 0 & 0 & 0 & 0 & 0 & 0 \end{bmatrix}$$

With respect to the Sparse Matrix 1, rows 2 and 3 can be exchanged. After the exchange, the rows and columns that have only one non-zero element are deleted, such as the rows 1, 2, 6 and 10, and columns 1, 9 and 10, as well as the rows and columns that have all zero elements, such as the column 5 The Matrix 2 is then obtained as below:

$$\begin{bmatrix} 0 & 0 & 0 & 4 & 2 & 3 \\ 0 & 0 & 0 & 1 & 1 & 4 \\ 0 & 0 & 3 & 3 & 5 & 4 \\ 3 & 5 & 1 & 2 & 0 & 0 \\ 2 & 3 & 2 & 0 & 0 & 0 \\ 2 & 5 & 4 & 0 & 0 & 0 \end{bmatrix}$$

Figure 2:
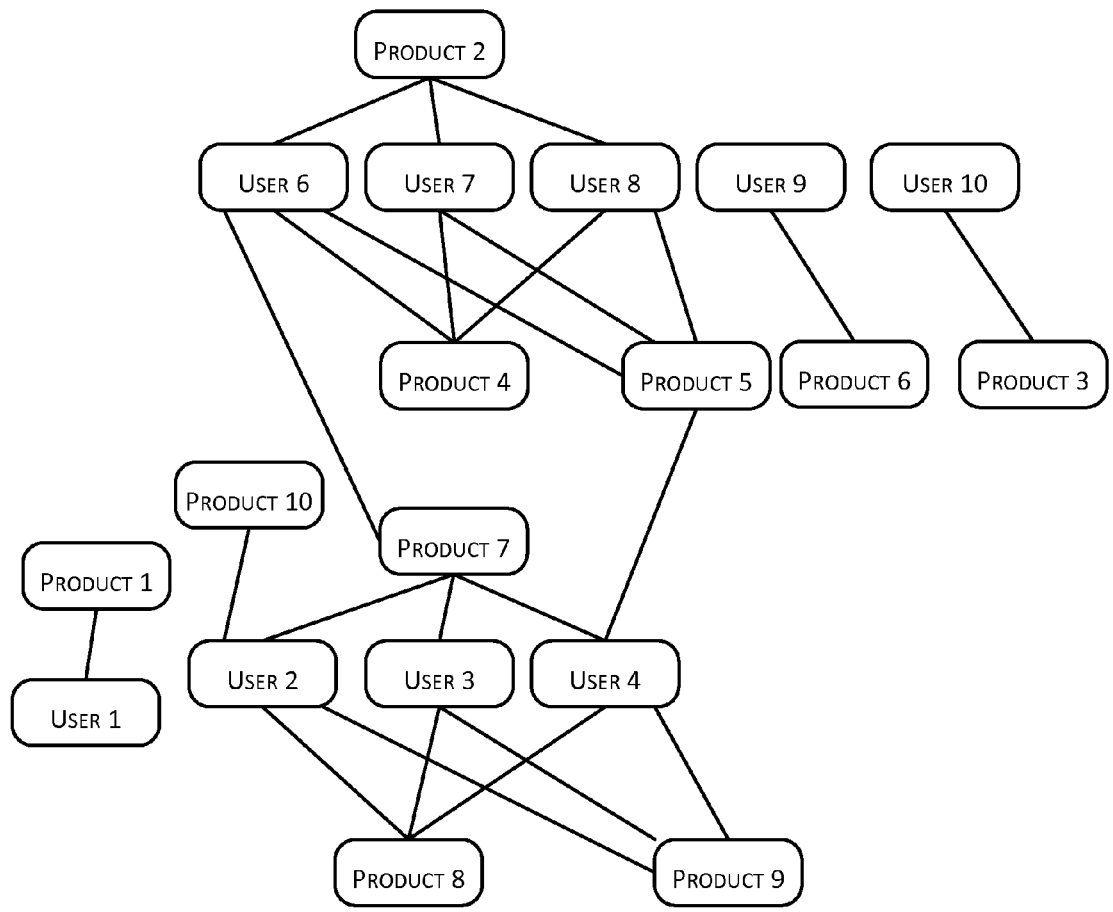
FIG. 2 illustrates a connection diagram of example production evaluation records.
Figure 3:
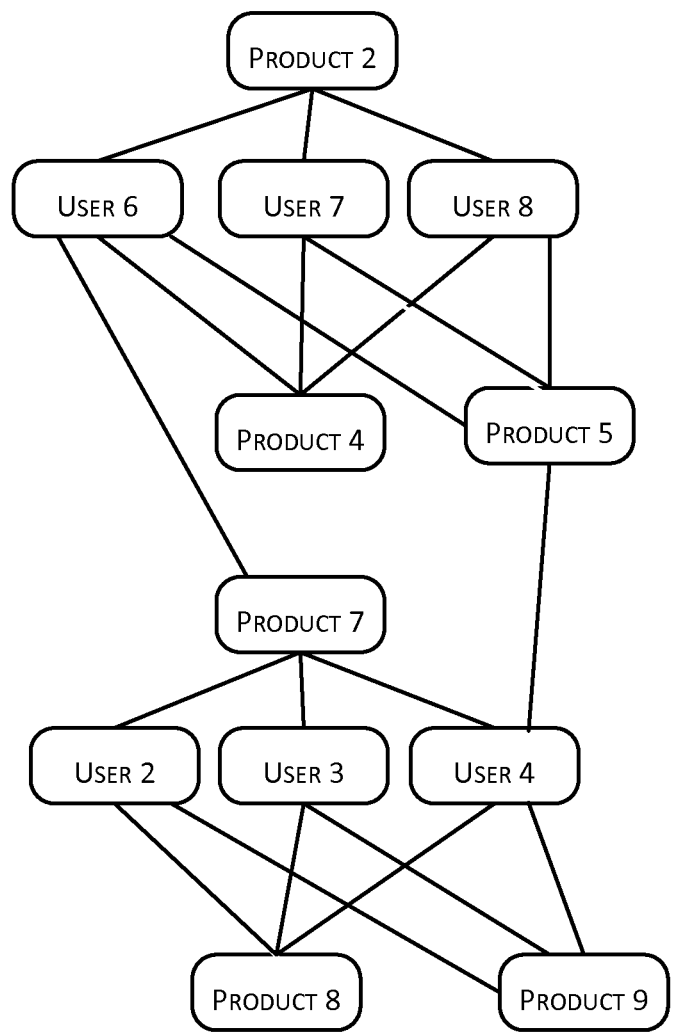
FIG. 3 illustrates a connection diagram of example production evaluation records after format conversion.

The above mentioned evaluation records may also be represented using a connection graph, as shown in FIG. 2. The user and the products are nodes. The lines represent the users' evaluations of the products. The above-mentioned format conversion of the evaluation records can be conducted as follows. Line removal operations are performed on the connection graph. In other words, with respect to nodes that are linked to other nodes by only one line, such line is removed and the connection graph is transformed into multiple connected sub-graphs. The multiple connected sub-graphs are linked together by one or more lines. Using FIG. 2 as an example, by removing the lines that link product 1 to user 1, product 10 to user 2, product 6 to user 9, and product 3 to user 10, two connected sub-graphs that are linked by two lines are obtained as shown in FIG. 3.

At 103, the product evaluation records are divided into multiple subsets of records by using the user ID and the product ID as the primary key, and the multiple subsets of records are assigned to multiple calculation nodes.

The primary keys are used to uniquely identify each piece of evaluation information in the product evaluation records. The system may use the number of calculation nodes, the information volume of the product evaluation records, and the distribution characteristics of non-zero elements as a basis to divide the primary keys into multiple intervals. Each interval of the primary keys includes one or more user IDs and one or more product IDs. There is no overlap between each interval's user IDs and product IDs. In one embodiment, all evaluation information, relating to one user ID and/or one product ID, in the product evaluation records are assigned into one subset of records.

Further, the product evaluation records may be divided according to the intervals of the primary keys. The evaluation information that are related to the user IDs and the product IDs contained in the respective interval of the primary keys are all treated as the respective subset of records corresponding to the respective interval. Therefore, the subsets of records resulting from the decomposition are the subsets of the evaluation records, where each subset of records corresponds to one primary key interval, and different subsets of records correspond to different user ID and product ID. In addition, all evaluation information that are related to the same user ID or product ID in the evaluation record are contained in the same subset of records, and are assigned to the same calculation node. The subsets of records are assigned to calculation nodes located in distributed clusters, which can perform parallel computing.

Take an example of the product evaluation records corresponding to the Matrix 2. The evaluation records include the evaluation information of users 2 to 4 and 6 to 8 on products 2, 4, 5, and 7 to 9. The primary key can be divided into 2 intervals: the interval 1 includes the users 6 to 8 and the products 2, 4 and 5, and the interval 2 includes the users 2 to 4 and the products 7 to 9. There is no overlapping between the interval 1 and the interval 2 regarding the user IDs and the product IDs. When the product evaluation records are divided according to the interval 1 and the interval 2, the evaluation information relating to the users 6 to 8 and the products 2, 4, and 5 contained in the interval 1 can be designated as the subset of records 1, and the evaluation information relating to the users 2-4 and the products 7-9 contained in the interval 2 can be designated as the subset of records 2. Similarly, the Matrix 2 can be decomposed into two non intersecting sub-matrices. The sub-matrix that corresponds to the subset of records 1 is:

$$\begin{bmatrix} 0 & 4 & 2 & 3 \\ 0 & 1 & 1 & 4 \\ 3 & 3 & 5 & 4 \\ 1 & 2 & 0 & 0 \end{bmatrix}$$

The sub-matrix that corresponds to the Subset of records 2 is:

$$\begin{bmatrix} 0 & 0 & 3 & 3 \\ 3 & 5 & 1 & 2 \\ 2 & 3 & 2 & 0 \\ 2 & 5 & 4 & 0 \end{bmatrix}$$

Figure 4:
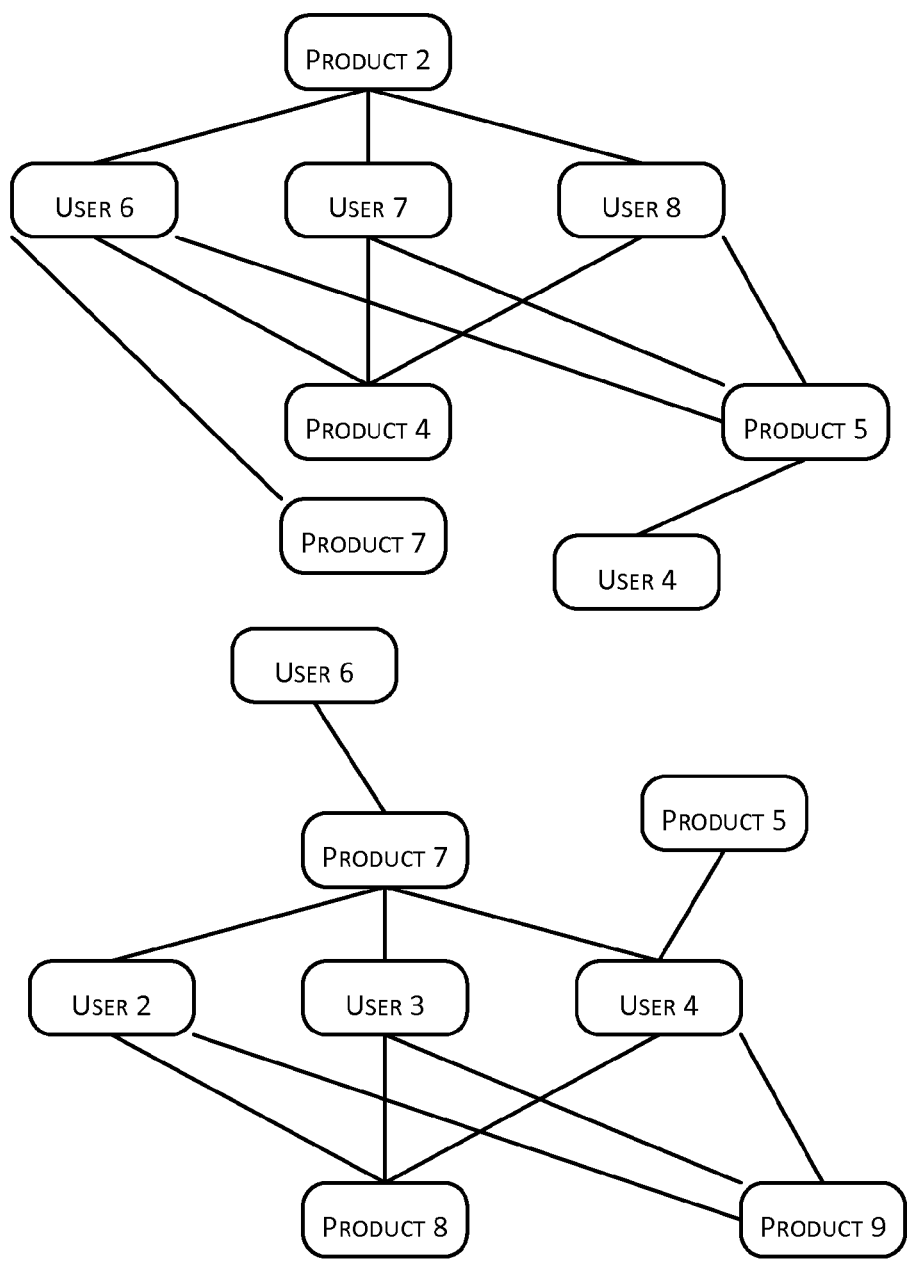
FIG. 4 illustrates a connection diagram of example subsets of records.

When the product evaluation records are represented by a connected graph, the connected graph corresponding to the product evaluation records can be divided into multiple connected sub-graphs based on the intervals of the primary key. Each connected sub-graph corresponds to a subset of records, as shown in FIG. 4. Two connected sub-graphs may be assigned to two parallel calculation nodes to ensure the completeness of the connected sub-graph assigned to each calculation node.

When the user ID or product ID is used as the primary key in dividing the product evaluation records, the product evaluation information related to one user ID or product ID may be included in several subsets of records. Take an example of the product evaluation records corresponding to the Matrix 2. If the evaluation information of all products made by the users 6 to 8 are grouped into one subset of records, and the evaluation information of all products made by the users 2 to 4 are grouped into another subset of records, then the evaluation information relating to the product 5 is included in two subsets of records, and the evaluation information relating to the product 7 is included in two subsets of records.

As the SVD algorithm requires that the evaluation information related to one product or user is calculated at one calculation node, the above divided subsets of records may not satisfy the SVD requirement. Therefore, the example embodiment of the present disclosure uses both the user ID and product ID as the primary key in dividing the product evaluation records instead of using either the user ID or the product ID as the primary key.

At 104, the multiple calculation nodes perform the SVD calculation on the assigned subsets of records to retrieve the user preference information and the product popularity information.

For example, after each calculation node receives its corresponding subset of records, it may use SVD calculation to perform parallel computing on its subset of records, in order to obtain the SVD calculation results. As the input for the SVD calculation, the subsets of records contain the users' evaluation information that includes the users' product preference information and the users' product popularity information.

The SVD calculation can decompose the above-mentioned two types of information from the subsets of records and obtain the SVD calculation result. The SVD calculation result includes the user preference information and the product popularity information. The user preference information represents the level of the user's preference for the product, and may include multiple user vectors. Each user vector represents a respective user's preference for the product. The product popularity information represents the level of the popularity of the product, and may include multiple product vectors. Each product vector represents a respective product's level of popularity. The user vectors and the product vectors may be represented using arrays.

For example, the subset of records assigned to a calculation node may be represented as a m×n matrix A, where m is the number of user IDs, and n is the number of product IDs. The matrix A represents the product evaluation records of m number of users on n number of products. The calculation node may use SVD calculation to divide the matrix A into the orthogonal matrix U with m levels and the orthogonal matrix V with n levels, and the product of the diagonal matrix S. The orthogonal matrix U with m levels and the orthogonal matrix V with n levels correspond to the user preference information and the product popularity information respectively. The m arrays that correspond to the rows or columns of the orthogonal matrix U are the user vectors corresponding to the m users that correspond to each user's attributes. The n arrays that correspond to the rows or columns of the orthogonal matrix V are the product vectors corresponding to the n products that correspond to each product's attributes At 105, the SVD calculation results calculated by the multiple calculation nodes of the assigned subsets of records are retrieved. The recommended product information is sent to the client terminal based on the SVD calculation results.

For example, the recommended product information may be obtained through a combination of SVD calculation results from the multiple calculation nodes and comparison of the user preference information and the product popularity information in the SVD calculation result. The recommendation product information is then sent to the client terminal.

In a scenario where the products are recommended based on the similarities between the user vectors, i.e., the user-user recommendation scenario, the similarities between the users may be obtained based on paired comparison between the user vectors corresponding to different users according to the calculated user preference information. The similarities between the users may be calculated by differences between the corresponding user vectors. The smaller the difference between the user vectors, the higher the similarity between the users.

With respect to the user who logged onto the client terminal, the other users may be ranked based on the similarities between the logged-in user and the other users. The users whose levels of similarities are greater than a predefined threshold or who satisfy a predefined ranking criteria (e.g., ranked in the top N positions, N can be any integer) are regarded as users who are comparable to the logged-in user. The determined comparable users' product evaluation information may be sent to the client terminal. For example, the comparable users' evaluation information on the above product is greater than a predefined evaluation threshold.

In a scenario where the products are recommended based on the similarities between the product vectors, i.e., the product-product recommendation scenario, the similarities between the products may be obtained based on paired comparison between the product vectors corresponding to different users according to the calculated product popularity information. The similarities between the products may be calculated by differences between the corresponding product vectors. The smaller the difference between the product vectors, the higher the similarity between the users.

With respect to the user who logged onto the client terminal, the products may be ranked based on the similarities between the products that the logged-in user has evaluated (for instance the products whose evaluation information evaluated by the logged-in user is greater than a threshold) and the other products. The products whose levels of similarities are greater than a predefined threshold or that satisfy a predefined ranking criteria (e.g., ranked in the top N positions, N can be any integer) are regarded as products that are comparable to the products that have been evaluated by the logged-in user. The determined comparable products information may be sent to the client terminal.

In a scenario where the products are recommended based on the similarities between the combinations of user vectors and product vectors, i.e., the user-product recommendation scenario, the similarities between various combinations of users and products may be obtained based on paired comparison between the combinations of user vectors and product vectors according to the user preference information and the product popularity information. The similarities between various combinations of users and products may be calculated by differences between the corresponding combinations of user vectors and product vectors. The smaller the difference between the combinations of user vectors and product vectors, the higher the similarity between such combinations of user vectors and product vectors.

With respect to the combinations of users who logged onto the client terminal and the products evaluated by the users, the combinations of users and products may be ranked and the combinations whose level of similarities are greater than a predefined threshold or that satisfy a predefined ranking criteria (e.g. ranked in the top N positions) are regarded as the combinations of users and products matching the above combinations. The product information in the determined combinations is sent to the client terminal.

In one embodiment, the evaluations of the users in the combinations to the products in the combinations are greater than a predefined evaluation threshold. Alternatively or concurrently, for the combination of the logged-in user and his/her evaluated products, the logged-in user's evaluation of the product is greater than a predefined evaluation threshold.

The example embodiment of the present disclosure includes at least the following advantages. The product evaluation records are divided by using the user ID and product ID as the primary key. The divided subsets of records are assigned into multiple calculation nodes and evaluation information in the evaluation records that are related to the same user ID or the same product ID are classified into one subset of records. This achieves the purpose to logically and simply assign evaluation records to multiple calculation nodes. Further, as the product evaluation records are assigned to the multiple calculation nodes for parallel calculation, and the recommended product information is sent to the client terminal based on the SVD calculation result, such techniques reduce the data volume and calculation complexity handled by the multiple calculation nodes. Using the user ID and product ID as the primary key in assigning the product evaluation records also ensures the completeness of the data processed by the calculation nodes, thereby increasing the accuracy of the calculation. It is to be appreciated that not all embodiments of the present disclosure need to simultaneously achieve all the advantages.

Based on the example methods for transmitting product information as discussed above, the present disclosure also provides a device that uses the method for transmitting product information.

Figure 5:
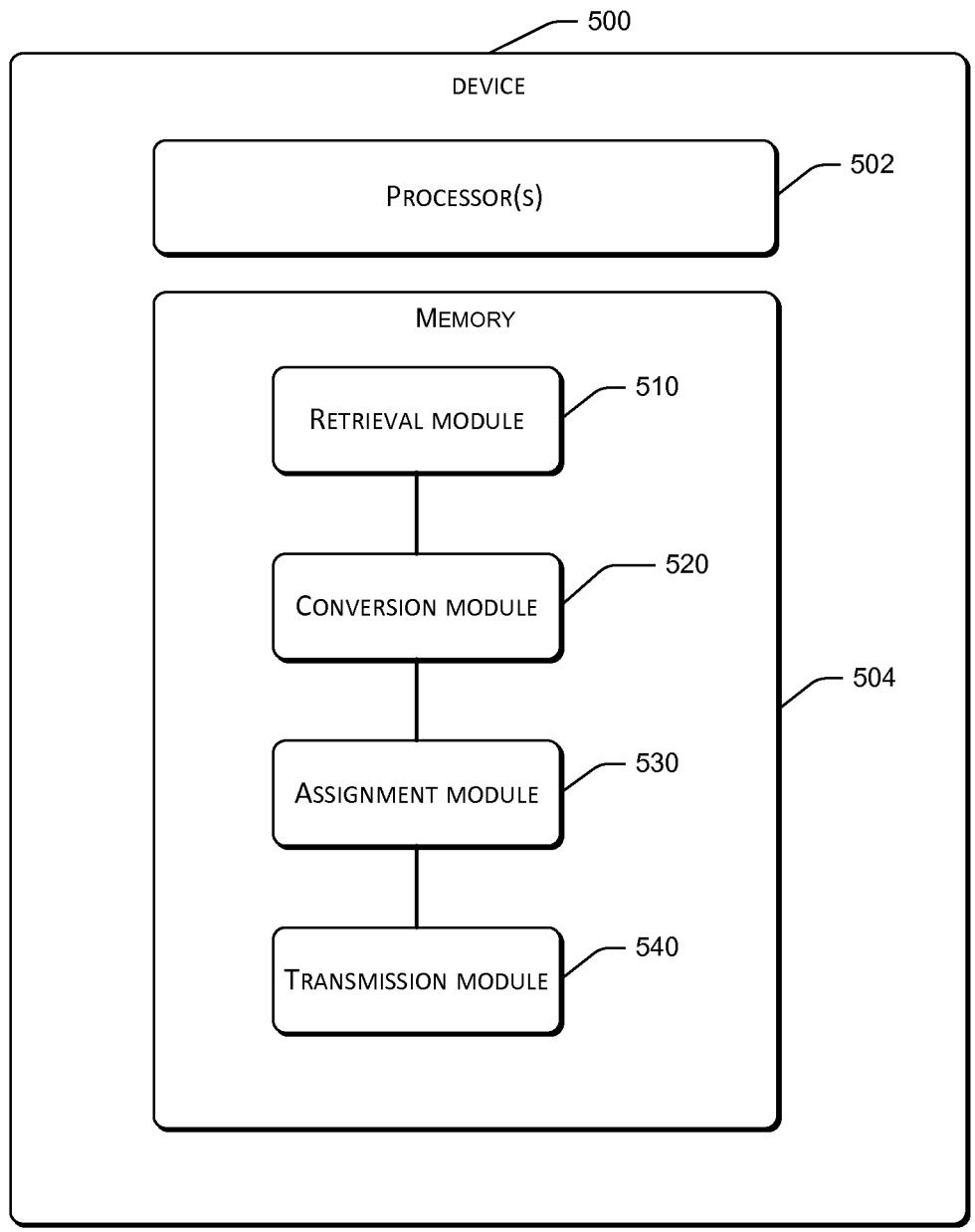
FIG. 5 illustrates a block diagram of an example device for transmitting product information.

FIG. 5 is a structure block diagram of an example device 500 for transmitting product information. In one embodiment, the device 500 can include, but is not limited to, one or more processors 502 and memory 504. The memory 504 may include computer-readable media in the form of volatile memory, such as random-access memory (RAM) and/or non-volatile memory, such as read only memory (ROM) or flash RAM. The memory 504 is an example of computer-readable media.

Computer-readable media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 504 may store therein program units or modules and program data. In one embodiment, the modules may include a retrieval module 510, an assignment module 520, and a transmission module 530. In one embodiment, the modules may further include a conversion module 540.

These modules may therefore be implemented in software that can be executed by the one or more processors 502. In other implementations, the modules may be implemented in firmware, hardware, software, or a combination thereof.

The retrieval module 510 retrieves the product evaluation records given by one or more users. For example, the product evaluation records may include the user ID, the product ID, and the evaluation information.

The assignment module 520 uses the user ID and the product ID as the primary key, divides the product evaluation records into multiple subsets of records according to intervals of the primary key, and assigns the multiple subsets of records to multiple calculation nodes. In one embodiment, all evaluation information, relating to one user ID and/or one product ID, in the product evaluation records are assigned into one subset of records.

The transmission module 530 retrieves the SVD calculation results of the assigned subsets of records, which are calculated by the multiple calculation nodes that are assigned, and, based on the SVD calculation results, sends the recommended product information to the client terminal.

For example, the SVD calculation results may include the user preference information and the product popularity information.

The transmission module 520 may, based on the user preference information, determine the users that match the user who log in the client terminal, and send the product information of the products that have been evaluated by the determined users to the client terminal. Alternatively, the transmission module 520 may, based on the product popularity information, determine the products that match the products that have been evaluated by the user who log in the client terminal, and send the product information of the determined products to the client terminal. Alternatively, the transmission module 520 may, based on both the user preference information and the product popularity information, determine the combinations of users and products that match the combinations of the user who log in the client terminal and the products that have been evaluated by the logged-in user, and send the product information in the determined combinations to the client terminal.

In one embodiment, the device 500 may further include the conversion module 540. The conversion module 540 converts the format of the product evaluation records.

Correspondingly, after the conversion module 540 converts the product evaluation records, the assignment module 520 divides the converted product evaluation records into several subsets of records.

For example, the conversion module 540 may adjust the ranking order of the evaluation information corresponding to each user ID and/or product ID, and/or delete the evaluation information corresponding to one or more user IDs and/or product IDs that satisfy one or more predefined conditions.

The conversion module 540 may perform columnar exchange and/or linear exchange on the matrix corresponding to the product evaluation records, and/or delete one or more rows and/or columns that satisfy one or more predefined conditions from the matrix corresponding to the product evaluation records.

The example embodiment of the present disclosure includes at least the following advantages. The product evaluation records are divided by using the user ID and product ID as the primary key. The divided subsets of records are assigned into multiple calculation nodes and evaluation information in the evaluation records that are related to the same user ID or the same product ID are classified into one subset of records. This achieves the purpose to logically and simply assign evaluation records to multiple calculation nodes. Further, as the product evaluation records are assigned to the multiple calculation nodes for parallel calculation, and the recommended product information is sent to the client terminal based on the SVD calculation result, such techniques reduce the data volume and calculation complexity handled by the multiple calculation nodes. Using the user ID and product ID as the primary key in assigning the product evaluation records also ensures the completeness of the data processed by the calculation nodes, thereby increasing the accuracy of the calculation. It is to be appreciated that not all embodiments of the present disclosure need to simultaneously achieve all the advantages.

From the exemplary embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in a storage media such as ROM/RAM, hard drive and optical disk. The software includes computer-executable instructions for a computing device (e.g., personal computer, server or networked device) to execute the method described in the exemplary embodiments of the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary device embodiment has been described in a relatively simple manner because of its fundamental correspondence with the exemplary method. Details thereof can be found with reference to related portions of the exemplary method. Descriptions of the above exemplary device are meant for illustrative purpose only. Units or modules described as separate components therein may or may not be physically separated. The modules described in the embodiments may be merged into one module or be further divided into multiple sub-modules. Components illustrated in terms of units or modules may or may not be physical units, e.g., may be located in one place or may be distributed among multiple network units. Depending on the actual needs, the goal of the exemplary embodiments may be achieved by selecting parts or all of the modules. One of ordinary skill in the art can understand and implement the disclosed system without any innovative effect.

The disclosed method and system may be used in an environment or in a configuration of universal computer systems with software or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, data structure, computer-executable instructions and etc., for executing specific tasks or implementing specific abstract data types. The disclosed method and device may also be implemented in a distributed computing environment. In the distributed computing environment, a task is executed by remote processing devices which are connected through a communication network. In distributed computing environment, the program modules may be located in storage media (which include storage devices) of local and/or remote computers.

Above are exemplary embodiments of the present disclosure. However, the present disclosure is not limited hereto. It is to be appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method of transmitting product information, performed by one or more processors configured with computer-executable instructions, the method comprising:
retrieving product evaluation records given by a plurality of users, each of the product evaluation records includes an identification of a user (user ID), an identification of a product (product ID), and evaluation information;
using the user ID and the product ID as a primary key;
comparing a number of elements of one user ID with a first threshold;
in the event that the number of elements of the one user ID is less than the first threshold, deleting each element of the one user ID;
dividing the product evaluation records into multiple subsets of records according to intervals of the primary key, wherein: the intervals of the primary key include more than one user ID and more than one product ID; user IDs and product IDs in different intervals of the primary key are non-overlapping; and the dividing of the product evaluation records comprises:
generating a connection graph, the connection graph including user IDs and at least one product ID corresponding to various nodes, and a line representing an evaluation performed by one user ID of one product ID;
determining whether a first set of nodes is connected to a second set of nodes by a single line; and
in the event that the first set of nodes is connected to the second set of nodes by the single line, removing the single line from the connection graph;
assigning the multiple subsets of records into multiple calculation nodes;
obtaining singular value decomposition (SVD) calculation results from the multiple calculation nodes of the assigned multiple subsets of records; and
sending recommended product information to a client terminal based on the SVD calculation results.

2. The method as recited in claim 1, wherein the assigning comprises assigning evaluation information relating to one user ID and/or one product ID into one subset of records.

3. The method as recited in claim 1, wherein the multiple calculation nodes are servers.

4. The method as recited in claim 1, wherein the SVD calculation results comprise user preference information and product popularity information.

5. The method as recited in claim 4, wherein the sending the recommended product information to the client terminal based on the SVD calculation results comprises:
based on the user preference information, determining one or more users that match a user who logs in to the client terminal; and
sending product information of products that have been evaluated by the determined users to the client terminal.

6. The method as recited in claim 4, wherein the sending the recommended product information to the client terminal based on the SVD calculation results comprises:
based on the product popularity information, determining one or more products that match one or more products that have been evaluated by a user who logs in to the client terminal; and
sending product information of the determined products to the client terminal.

7. The method as recited in claim 4, wherein the sending the recommended product information to the client terminal based on the SVD calculation results comprises:
- based on both the user preference information and the product popularity information, determining one or more combinations of users and products that match combinations of a user who logs in to the client terminal and one or more products that have been evaluated by the logged-in user; and
- sending product information of products in the determined combinations to the client terminal.

8. The method as recited in claim 1, further comprising, after retrieving the product evaluation records, converting a format of the product evaluation records.

9. The method as recited in claim 8, wherein the dividing the product evaluation records into multiple subsets of records comprises dividing the product evaluation records after format conversion.

10. The method as recited in claim 8, wherein the converting comprises:
- adjusting a ranking order of the evaluation information corresponding to each user ID and/or product ID; and/or
- deleting evaluation information corresponding to one or more user IDs and/or product IDs that satisfy a predefined condition.

11. The method as recited in claim 10, wherein:
- the adjusting comprises performing a columnar exchange and/or a linear exchange on a matrix corresponding to the product evaluation records; and
- the deleting comprises deleting a row and/or a column that satisfies a predefined condition from the matrix corresponding to the product evaluation records.

12. A device for transmitting product information comprising:
- a processor and memory, the memory storing the following modules, which are executable by the processor:
- a retrieval module that retrieves product evaluation records given by a plurality of users, each of the product evaluation records includes an identification of a user (user ID), an identification of a product (product ID), and evaluation information;
- an assignment module that uses the user ID and the product ID as a primary key, compares a number of elements of one user ID with a first threshold, in the event that the number of elements of the one user ID is less than the first threshold, deletes each element of the one user ID, divides the product evaluation records into multiple subsets of records according to intervals of the primary key, and assigns the multiple subsets of records into multiple calculation nodes, wherein: the intervals of the primary key include more than one user ID and more than one product ID; user IDs and product IDs in different intervals of the primary key are non-overlapping; and the dividing of the product evaluation records into multiple subsets of records comprises:
  - generating a connection graph, the connection graph including user IDs and at least one product ID corresponding to various nodes, and a line representing an evaluation performed by one user ID of one product ID;
  - determining whether a first set of nodes is connected to a second set of nodes by a single line; and
  - in the event that the first set of nodes is connected to the second set of nodes by the single line, removing the single line from the connection graph; and
- a transmission module that obtains singular value decomposition (SVD) calculation results from the multiple calculation nodes of the assigned multiple subsets of records, and sends recommended product information to a client terminal based on the SVD calculation results.

13. The device as recited in claim 12, wherein the assignment module further assigns evaluation information relating to one user ID and/or one product ID into one subset of records.

14. The device as recited in claim 12, wherein:
- the SVD calculation results comprise user preference information and product popularity information; and
- the transmission module further performs one or more of following operations:
  - based on the user preference information, determining one or more users that match a user who logs in to the client terminal, and sending product information of products that have been evaluated by the determined users to the client terminal;
  - based on the product popularity information, determining one or more products that match one or more products that have been evaluated by a user who logs in to the client terminal, and sending product information of the determined products to the client terminal; and
  - based on both the user preference information and the product popularity information, determining one or more combinations of users and products that match combinations of a user who logs in to the client terminal and one or more products that have been evaluated by the logged-in user and sending product information of products in the determined combinations to the client terminal.

15. The device as recited in claim 12, further comprising a conversion module that converts a format of the product evaluation records.

16. The device as recited in claim 15, wherein the assignment module further divides the product evaluation records after format conversion.

17. The device as recited in claim 15, wherein the conversion module further adjusts a ranking order of the evaluation information corresponding to each user ID and/or product ID, and/or deletes evaluation information corresponding to one or more user IDs and/or product IDs that satisfy a predefined condition.

18. The device as recited in claim 17, wherein the conversion module further performs a columnar exchange and/or a linear exchange on a matrix corresponding to the product evaluation records, and/or deletes a row and/or a column that satisfies a predefined condition from the matrix corresponding to the product evaluation records.

19. One or more non-transitory computer-readable media comprising computer-executable instructions executable by one or more processors that, when executed by the one or more processors, cause the one or more processors to perform operations comprising:
- retrieving product evaluation records given by a plurality of users, each of the product evaluation records includes an identification of a user (user ID), an identification of a product (product ID), and evaluation information;
- using the user ID and the product ID as a primary key;
- comparing a number of elements of one user ID with a first threshold;
- in the event that the number of elements of the one user ID is less than the first threshold, deleting each element of the one user ID;
- dividing the product evaluation records into multiple subsets of records according to intervals of the primary key, wherein: the intervals of the primary key include more than one user ID and more than one product ID; user IDs and product IDs in different intervals of the primary key are non-overlapping; and the dividing of the product evaluation records into multiple subsets of records comprises:
  generating a connection graph, the connection graph including user IDs and at least one product ID corresponding to various nodes, and a line representing an evaluation performed by one user ID of one product ID;
  determining whether a first set of nodes is connected to a second set of nodes by a single line; and
  in the event that the first set of nodes is connected to the second set of nodes by the single line, removing the single line from the connection graph;
assigning the multiple subsets of records into multiple calculation nodes, the assigning comprising assigning evaluation information relating to one user ID and/or one product ID into one subset of records;
obtaining singular value decomposition (SVD) calculation results from the multiple calculation nodes of the assigned multiple subsets of records, the SVD calculation results including user preference information and product popularity information; and
sending recommended product information to a client terminal based on the SVD calculation results.

* * * * *